US011143515B2

(12) United States Patent
Schreier

(10) Patent No.: US 11,143,515 B2
(45) Date of Patent: Oct. 12, 2021

(54) METHOD FOR THE GENERATION OF A MERGED FREE-SPACE MAP, ELECTRONIC CONTROL DEVICE AND STORAGE MEDIUM

(71) Applicant: Continental Teves AG & Co. oHG, Frankfurt am Main (DE)

(72) Inventor: Matthias Schreier, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 172 days.

(21) Appl. No.: 16/486,318

(22) PCT Filed: Feb. 8, 2018

(86) PCT No.: PCT/DE2018/200008
§ 371 (c)(1),
(2) Date: Aug. 15, 2019

(87) PCT Pub. No.: WO2018/166567
PCT Pub. Date: Sep. 20, 2018

(65) Prior Publication Data
US 2020/0271456 A1 Aug. 27, 2020

(30) Foreign Application Priority Data
Mar. 15, 2017 (DE) .................... 10 2017 204 342.3

(51) Int. Cl.
*G01C 21/32* (2006.01)
*G01S 19/42* (2010.01)
(Continued)

(52) U.S. Cl.
CPC .............. *G01C 21/32* (2013.01); *G01S 19/42* (2013.01); *G08G 1/123* (2013.01); *G08G 1/143* (2013.01)

(58) Field of Classification Search
CPC ....... G01C 21/32; G01S 19/42; G01S 5/0072; G01S 13/726; G01S 13/931; G08G 1/163; G08G 1/164
See application file for complete search history.

(56) References Cited

U.S. PATENT DOCUMENTS 5,173,691 A * 12/1992 Sumner ................ G08G 1/0104
340/905
6,178,374 B1 * 1/2001 Mohlenkamp ... G08G 1/096716
340/905
(Continued)

FOREIGN PATENT DOCUMENTS

DE 102010006084 A1 10/2010
DE 102014111126 A1 2/2016
(Continued)

OTHER PUBLICATIONS

Schreier et al., "Compact Representation of Dynamic Driving Environments for ADAS by Parametric Free Space and Dynamic Object Maps", IEEE Transactions on Intelligent Transportation Systems, vol. 17, No. 2, Feb. 2016—pp. 367-384.
(Continued)

*Primary Examiner* — Mussa A Shaawat
(74) *Attorney, Agent, or Firm* — RatnerPrestia

(57) ABSTRACT

A method for the generation of a merged free-space map in a motor vehicle or in an infrastructure unit, wherein free space maps are generated and transmitted using vehicle-to-X communication. Parametric free space maps are used in this case. An associated electronic control device and an associated storage medium are also provided.

19 Claims, 3 Drawing Sheets

(51) Int. Cl.
  *G08G 1/123* (2006.01)
  *G08G 1/14* (2006.01)

(56) References Cited

U.S. PATENT DOCUMENTS

| | | | |
|---|---|---|---|
| 8,229,663 B2 | 7/2012 | Zeng et al. | |
| 10,338,601 B2 | 7/2019 | Heimberger et al. | |
| 2002/0183929 A1* | 12/2002 | Tsuji | G06T 7/20 |
| | | | 701/301 |
| 2006/0091654 A1* | 5/2006 | De Mersseman | G01S 13/867 |
| | | | 280/735 |
| 2007/0285305 A1* | 12/2007 | Tanaka | G01S 17/931 |
| | | | 342/70 |
| 2010/0198513 A1* | 8/2010 | Zeng | G01S 17/931 |
| | | | 701/300 |
| 2011/0047338 A1* | 2/2011 | Stahlin | G01C 21/32 |
| | | | 711/154 |
| 2012/0150385 A1* | 6/2012 | Paquette | H04L 67/12 |
| | | | 701/33.4 |
| 2017/0025017 A1* | 1/2017 | Thomas | B60W 30/08 |
| 2017/0236419 A1 | 8/2017 | Grewe | |
| 2017/0261995 A1* | 9/2017 | Heimberger | G05D 1/0088 |
| 2018/0053060 A1* | 2/2018 | Huang | G01S 5/16 |
| 2018/0173229 A1* | 6/2018 | Huang | G05D 1/0088 |
| 2018/0252538 A1* | 9/2018 | Stahlin | G08G 1/096741 |

FOREIGN PATENT DOCUMENTS

| | | |
|---|---|---|
| DE | 102014220687 A1 | 4/2016 |
| JP | 2011065279 A | 3/2011 |

OTHER PUBLICATIONS

Wang et al., "CrowdAtlas: Self-Updating Maps for Cloud and Personal Use", MobiSys'13, Jun. 25-28, 2013, Taipei, Taiwan—14 pages.

International Search Report and Written Opinion for International Application No. PCAT/DE2018/200008, dated Jul. 26, 2018, 13 pages.

German Search Report for German Application No. 10 2017 204 342.3, dated Sep. 15, 2017 with partial translation, 10 pages.

* cited by examiner

METHOD FOR THE GENERATION OF A MERGED FREE-SPACE MAP, ELECTRONIC CONTROL DEVICE AND STORAGE MEDIUM

CROSS REFERENCE TO RELATED APPLICATIONS

This application is the U.S. National Phase Application of PCT International Application No. PCT/EP2018/200008, filed Feb. 8, 2018, which claims priority to German Patent Application No. 10 2017 204 342.3, filed Mar. 15, 2017, the contents of such applications being incorporated by reference herein.

FIELD OF THE INVENTION

The invention relates to a method for the generation of a merged free-space map in a motor vehicle or in an infrastructure unit. The invention further relates to an associated electronic control device and an associated storage medium.

BACKGROUND OF THE INVENTION

Free space maps typically serve to represent the respective driving environment of motor vehicles. Free space maps typically represent drivable areas on which a respective motor vehicle or indeed other motor vehicles or vehicles in general may drive. These areas consist for example of typical road courses, which may be corrected around elements such as parked vehicles or other obstacles. A free space map may however also be independent of the road course and represent areas which are in principle drivable, for example parking lots.

The region around a motor vehicle which may be detected using environment sensors of the respective motor vehicle is naturally limited. This also restricts the maximum extent of free space maps generable using an environment sensor system. For this reason, it is desirable to merge free space maps from different motor vehicles to yield larger free space maps, such that larger regions can be covered. Particularly in the context of the introduction of autonomous vehicles and the continuous further development of exacting driver assistance systems, a significant advantage may be achieved if a vehicle is in this way made aware of its surroundings in particularly pronounced detail and over a larger region.

Typical free space maps are represented by entries on a grid. For example, a binary representation may be used, wherein a 0 indicates a free space and a 1 a non-drivable space or an obstacle or part of an obstacle. Such free space maps may represent the surroundings of a vehicle in great detail, but have proven not very advantageous when it comes to transmission between vehicles or indeed between vehicles and infrastructure units, since they are very large for common data transmission systems and therefore require long transfer times. In particular for typical vehicle-to-X communication, known free space maps have proven too large for regular exchange between vehicles and/or infrastructure units.

SUMMARY OF THE INVENTION

An aspect of the invention is a method for generating a merged free space map which can manage with lower data transmission rates. Another aspect of the invention is an associated control device and an associated storage medium.

An aspect of the invention relates to a method for generating a merged free space map in a first motor vehicle. The method has the following steps:
  producing a first free space map using an environment sensor system of the first motor vehicle,
  receiving a second free space map from a second motor vehicle or an infrastructure unit using vehicle-to-X communication, and
  generating the merged free space map by merging the first free space map and the second free space map,
  wherein the free space maps are parametric free space maps.

An aspect of the invention further relates to a method for generating a merged free space map in an infrastructure unit. The method has the following steps:
  receiving a first free space map from a first motor vehicle or a further infrastructure unit using vehicle-to-X communication,
  receiving a second free space map from a second motor vehicle or a further infrastructure unit using vehicle-to-X communication, and
  generating the merged free space map by merging the first free space map and the second free space map,
  wherein the free space maps are parametric free space maps.

Using the methods according to aspects of the invention, it is possible to reduce markedly the required data transmission rates, since parametric free space maps are used in the present case. These are markedly smaller than the grid-based free space maps otherwise used and may therefore be transmitted continuously in the context of conventional vehicle-to-X communication.

As mentioned, the merged free space map may in particular be generated in a motor vehicle or indeed in an infrastructure unit. The infrastructure unit may for example also be a vehicle-to-X communication backend.

It should be understood that the described methods may accordingly also be extended to any desired number of more than two maps. In this way, the region covered may be enlarged still further.

An above-mentioned further infrastructure unit may be any desired infrastructure unit which is different from that infrastructure unit which performs the method according to an aspect of the invention. Any number of further infrastructure units may be used in the context of the method.

The first free space map was preferably produced using an environment sensor system of the first motor vehicle. Use of such an environment sensor system represents an advantageous approach to the generation of free space maps.

An environment sensor system of a motor vehicle may for example be sensors such as cameras, ultrasonic sensors, radar, LiDAR or other units which are capable of detecting the surroundings of the motor vehicle.

The first free space map and the second free space map preferably include respective location information. In this way, it may be indicated precisely which region the respective free space maps cover. For example, a center point or another distinctive point of the respective free space map may be provided with such location information. The location information may be based in particular on satellite navigation. This has proven advantageous for typical applications, since such location information is typically available in motor vehicles. The location information may however additionally or alternatively be based, for example, on other position determining methods, for example using vehicle dynamics sensors or surroundings sensors.

According to one preferred method, the first free space map and the second free space map are aligned for merging on the basis of the location information. This allows exact positioning of the two free space maps relative to one another, such that they may be joined correctly together.

According to one likewise preferred embodiment, similar regions in the first free space map and in the second free space map are identified, wherein the free space maps are aligned for merger on the basis of the similar regions. In this case, even if location information is lacking, alignment of the free space maps may take place. Furthermore, the alignment based on location information may thereby be plausibility checked. It goes without saying that alignment using location information and alignment using similar regions may be combined in any desired manner.

The second free space map was preferably produced using the environment sensor system of the second motor vehicle. In this way, the environment sensor system of the second vehicle may be used to detect the region around the second motor vehicle. In this way, the regions around the first motor vehicle and the second motor vehicle may in particular be considered together.

The free space maps are preferably represented by respective parameterized functions. The functions may in particular be wholly or partly splines. This has proven advantageous for representing typical forms of free space maps with the fewest possible parameters. Such parameterized functions typically require only a small number of parameters, which keeps the amount of data to be transmitted small on transmission of the respective free space map.

According to one further development, the method further includes the following step:
sending the merged free space map using vehicle-to-X communication to a number of further vehicles and/or further infrastructure units.

In this way, the merged free space map may also be made available to other vehicles or further infrastructure units or a vehicle-to-X communication backend. These may thus benefit from the ready-merged free space map and are able to refrain from repeating the same computing operations. Since the merged free space map is also a parametric free space map, the above-mentioned advantages also apply thereto with regard to size.

The generation of parametric free space maps, as may advantageously be used in the context of the methods described herein, is described, for example, in "Schreier, M. et al.: Compact Representation of Dynamic Driving Environments for ADAS by Parametric Free Space and Dynamic Object Maps, IEEE Transactions on Intelligent Transportation Systems, vol. 17(2), February 2016". This document is incorporated by express reference into the present application.

Each free space map preferably has a size of at most 500 bytes. Particularly preferably, each free space map has a size of at most 330 bytes. Such sizes may typically be achieved using parametric free space maps, but not with grid-based free space maps.

The free space maps are preferably sent and/or received uncompressed. Compression, as is typically performed in the case of grid-based free space maps to reduce the size thereof, may advantageously be dispensed with. Savings in computing power are thus made.

An aspect of the invention further relates to an electronic control device configured to perform a method according to an aspect of the invention. Use may here be made of all the embodiments and variants described herein.

An aspect of the invention further relates to a non-volatile computer-readable storage medium containing program code, on execution of which a processor performs a method according to an aspect of the invention. Use may be made here too of all the embodiments and variants described herein.

In particular, an extended free space description may be obtained using a merged free space map. This may for example be used to enable extended predictive trajectory planning or to plausibility check or refine locally produced free space maps.

For example, with a communication transmission bandwidth of 5 kB/s, a free space map of 330 bytes may be transmitted every 60 ms.

BRIEF DESCRIPTION OF THE DRAWINGS

A person skilled in the art will infer further features and advantages from the exemplary embodiment described below with reference to the appended drawings, in which.

DETAILED DESCRIPTION OF THE PREFERRED EMBODIMENTS

Figure 1:
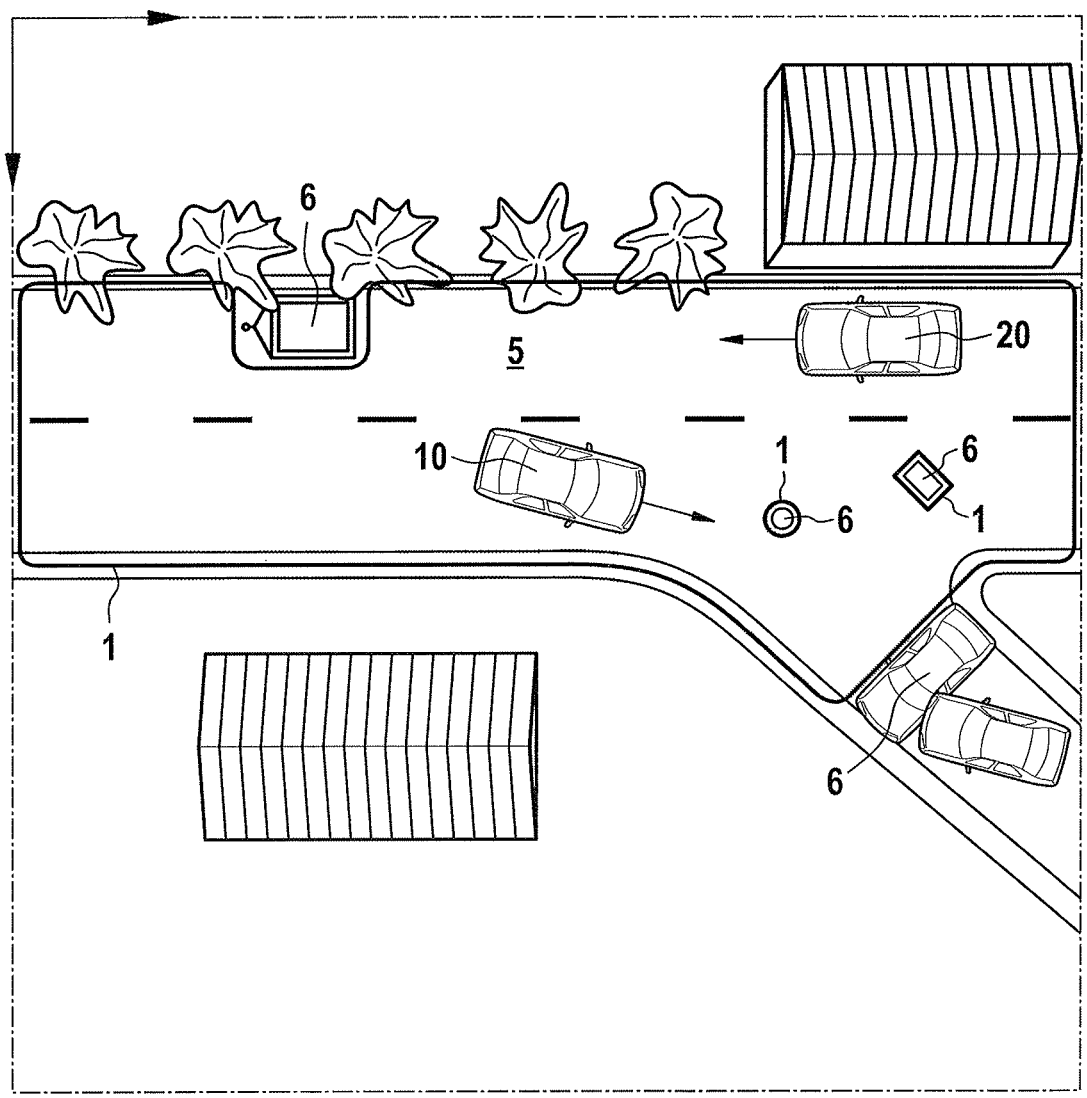
FIG. 1 shows an arrangement with two vehicles on a road.

FIG. 1 shows a first motor vehicle 10 and a second motor vehicle 20 both of which are moving on a road 5. The road 5 has, as shown, a continuous section and a fork.

On the road 5, there are obstacles 6 which are represented here by way of example as a trailer, as objects on the carriageway and as an accident scene. In principle, the road 5 is usable by both of the vehicles 10, 20, but they must be aware of the obstacles 6. The obstacles 6 cannot be driven over by the vehicles 10, 20 and thus need to be taken into consideration in trajectory planning.

A free space map 1 indicating the drivable region of the road 5 is also shown in FIG. 1. The free space map 1 was generated in the present case by the first motor vehicle 10. In more general terms, a free space map indicates the drivable region for a vehicle, which may also be located away from a road, for example on a parking lot.

As shown, the obstacles 6 are here also surrounded by boundaries of the free space map 1, such that the vehicles 10, 20 do not collide with the obstacles 6 when they are moving within the region represented by the free space map 1.

Figure 2:
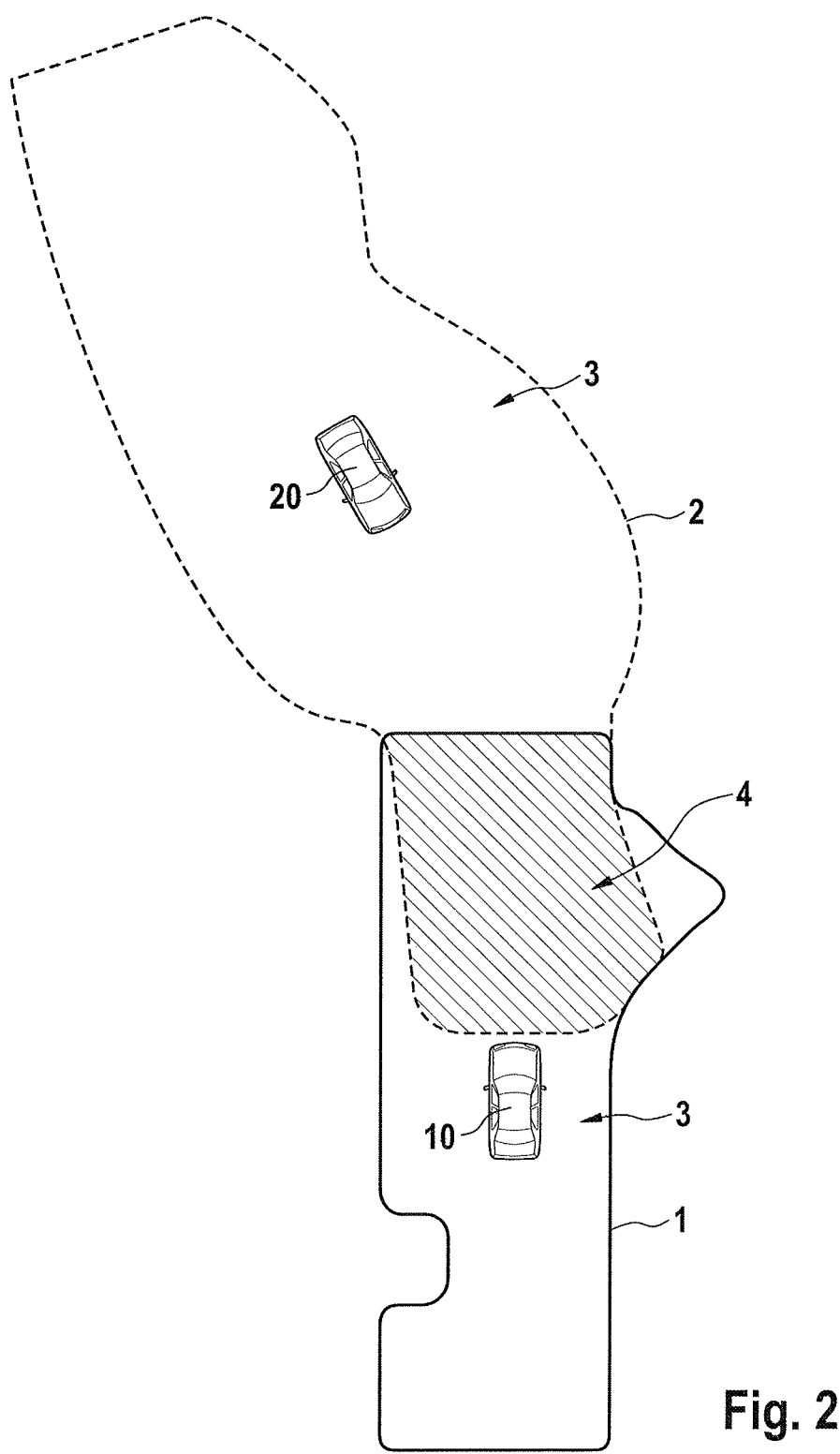
FIG. 2 shows the merger of two free space maps.

FIG. 2 shows the merger of two free space maps, namely a first free space map 1 and a second free space map 2. The first free space map 1 in this case surrounds a first vehicle 10. The second free space map 2 surrounds a second vehicle 20. The free space maps 1, 2 were produced using respective environment sensors of the respective vehicles 10, 20.

The first free space map 1 is shown in FIG. 2 with solid lines, whereas the second free space map 2 is shown with dashed lines.

As shown, the two free space maps 1, 2 have an overlap 4. This is covered by both free space maps 1, 2.

When the two free space maps 1, 2 are merged, a merged free space map 3 arises which covers the entire region shown.

The merged free space map 3 is defined by the external contours of the first free space map 1 and the second free space map 2 and indicates the entire region which has been detected and may be used by the two vehicles 10, 20.

Figure 3:
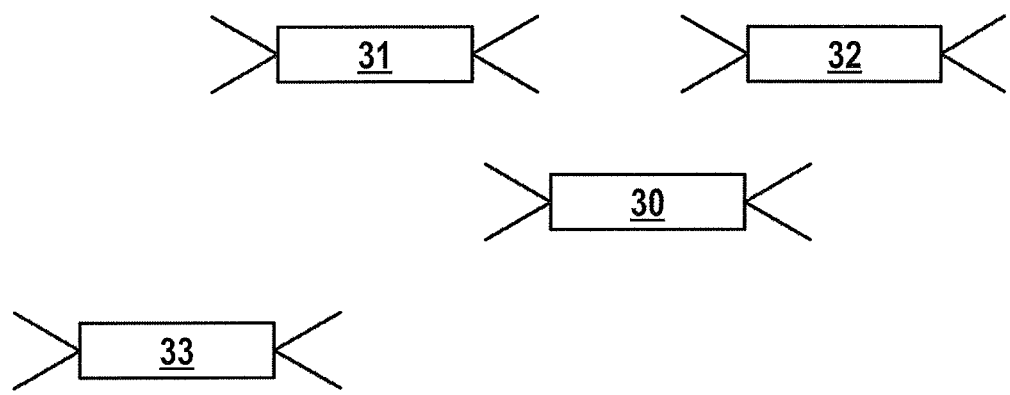
FIG. 3 shows an arrangement with two vehicles and one infrastructure unit.
Figure 3:
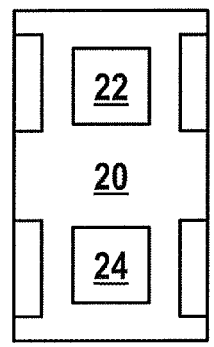
Figure 3:
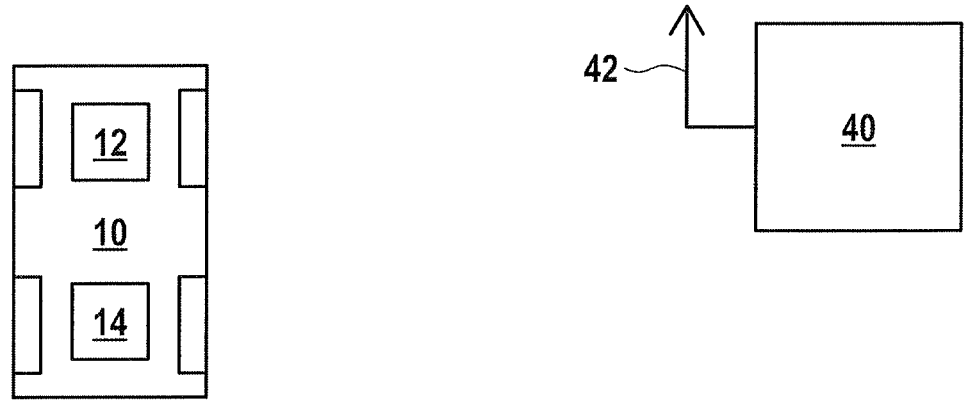

FIG. 3 shows an arrangement with a first vehicle 10, a second vehicle 20 and an infrastructure unit 40. The first vehicle 10 has a first vehicle-to-X communication module 12. The second vehicle 20 has a second vehicle-to-X communication module 22. This enables the two vehicles 10, 20 to participate in vehicle-to-X communication. The infrastructure unit 40 is also configured to participate in vehicle-to-X communication, this being represented schematically by an antenna 42.

Furthermore, four satellites 30, 31, 32, 33 are shown purely schematically in FIG. 3. Due to this, the vehicles 10, 20 can determine their respective positions by satellite navigation.

The first vehicle 10 has a first environment sensor system 14. The second vehicle 20 has a second environment sensor system 24. The environment sensor systems 14, 24 are also represented purely schematically here. Each of vehicles 10, 20 may detect its environment using the respective environment sensor system 14, 24, and produce a parameterized free space map therefrom. The respective free space map may be provided with location information, which is based on the position of the respective vehicle 10, 20 determined using satellite navigation.

The two vehicles 10, 20 and the infrastructure unit 40 may exchange the free space maps produced with one another. Both the vehicles 10, 20 and the infrastructure unit 40 may in this case merge produced free space maps, such that the merged free space map covers a larger region than the free space maps used in said merger. In principle, any desired number of free space maps may be merged into a merged free space map.

A respective merged free space map may in turn be transmitted to other units, i.e. for example to the vehicles 10, 20, to further vehicles, to the infrastructure unit 40 or indeed to further infrastructure units or to a vehicle-to-X communication backend. The corresponding information may thus be widely disseminated and may generally contribute to increasing traffic safety.

The fact that in the present case only parameterized free space maps are used, i.e. both for the free space maps produced by the vehicles 10, 20 and for the merged free space maps, means that transmission using vehicle-to-X communication is straightforwardly possible. This is in particular because of the very small sizes, which typically amount to at most around 500 bytes per free space map.

Alignment of free space maps to be merged may in this case proceed in particular on the basis of location information determined by satellite navigation. It is however also possible for similar regions of the free space maps to be identified and caused to overlap accordingly.

Due to the small size, compression of the free space maps may advantageously be dispensed with.

In general, it should be noted that vehicle-to-X communication is in particular taken to mean direct communication between vehicles and/or between vehicles and infrastructure units. For example, it may thus be vehicle-to-vehicle communication or vehicle-to-infrastructure communication. If, in the context of this application, reference is made to communication between vehicles, this may in principle proceed for example in the context of vehicle-to-vehicle communication, which typically proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4, each of which are incorporated herein by reference. Vehicle-to-X communication may also be described as C2X communication. The sub-categories may be described as C2C (car-to-car) or C2I (car-to-infrastructure). However, an aspect of the invention explicitly does not rule out vehicle-to-X communication with mediation for example via a mobile radio network.

The stated steps of the method according to an aspect of the invention may be performed in the stated order. They may, however, also be performed in a different order. In one of the embodiments of the method according to an aspect of the invention, the method may for example be performed with a specific combination of steps in such a manner that no further steps are performed. Further steps may, however, in principle also be performed, including some which have not been mentioned.

The claims belonging to the application do not amount to a renouncement of achieving more extensive protection.

If it turns out, over the course of the procedure, that a feature or a group of features is not absolutely necessary, then the applicant already requests now a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood also to be covered by the disclosure of this application.

It should further be noted that configurations, features and variants of aspects of the invention, which are described in the various embodiments or exemplary embodiments and/or shown in the figures, may be combined together as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which is essential to aspects of the invention. They may therefore also be included individually in claims for the purpose of differentiation from the prior art.

The invention claimed is:

1. A method for the generation of a merged parametric free space map in a first motor vehicle, the method comprising:
   detecting, by an environment sensor system of the first motor vehicle, surroundings of the first motor vehicle,
   producing, by a processor of the first motor vehicle, a first parametric free space map using the detected surroundings of the first motor vehicle,
   receiving, by a vehicle-to-X communication receiver of the first motor vehicle, a second parametric free space map transmitted from a second motor vehicle or transmitted from an infrastructure unit using vehicle-to-X communication,
   generating, by the processor, the merged parametric free space map by merging the first parametric free space map and the second parametric free space map, the merged parametric free space map having an external contour defined by merging external contours of the first parametric free space map and the second parametric free space map, and controlling, by the processor, the first motor vehicle based on the merged parametric free space map.

2. A method for the generation of a merged parametric free space map in an infrastructure unit, the method comprising:

receiving, by a vehicle-to-X communication receiver of the infrastructure unit, a first parametric free space map transmitted from a first motor vehicle or transmitted from a further infrastructure unit using vehicle-to-X communication, receiving, by the vehicle-to-X communication receiver of the infrastructure unit, a second parametric free space map transmitted from a second motor vehicle or transmitted from a further infrastructure unit using vehicle-to-X communication, generating, by a processor of the infrastructure unit, the merged parametric free space map by merging the first parametric free space map and the second parametric free space map, the merged parametric free space map having an external contour defined by merging external contours of the first parametric free space map and the second parametric free space map, and transmitting, by the vehicle-to-X communication receiver of the infrastructure unit, the merged parametric free space map to at least one of the first motor vehicle or the second motor vehicle for use in controlling the at least one of the first motor vehicle or the second motor vehicle based on the merged parametric free space map.

3. The method according to claim 2,
wherein the first parametric free space map was produced using an environment sensor system of the first motor vehicle.

4. The method according to claim 1,
wherein the first parametric free space map and the second parametric free space map include respective location information.

5. The method according to claim 4,
wherein the location information is based on satellite navigation.

6. The method according to claim 4,
wherein the first parametric free space map and the second parametric free space map are aligned for merger on the basis of the location information.

7. The method according to claim 1,
wherein similar regions in the first parametric free space map and in the second parametric free space map are identified,
wherein the parametric free space maps are aligned for merger on the basis of the similar regions.

8. The method according to claim 1,
wherein the second parametric free space map was produced using an environment sensor system of the second motor vehicle.

9. The method according to claim 1,
wherein the parametric free space maps are represented by respective parameterized functions.

10. The method according to claim 9,
wherein the functions are wholly or partly splines.

11. The method according to claim 1,
further comprising:
sending the merged parametric free space map using vehicle-to-X communication to a number of further vehicles and/or further infrastructure units.

12. The method according to claim 1,
wherein each parametric free space map has a size of at most 500 bytes.

13. The method according to claim 1,
wherein the parametric free space maps are sent and/or received uncompressed.

14. An electronic control device configured to perform a method according to claim 1.

15. A non-volatile computer-readable storage medium containing program code, on execution of which a processor performs a method according to claim 1.

16. The method according to claim 2, wherein the first parametric free space map and the second parametric free space map include respective location information.

17. The method according to claim 5, wherein the first parametric free space map and the second parametric free space map are aligned for merger on the basis of the location information.

18. The method according to claim 2, further comprising sending the merged parametric free space map using vehicle-to-X communication to a number of further vehicles and/or further infrastructure units.

19. The method according to claim 1, wherein each parametric free space map has a size of at most 330 bytes.

* * * * *